Patented July 10, 1951

2,560,495

UNITED STATES PATENT OFFICE 2,560,495

INTERPOLYMERS OF POLYOLEFINIC 2-ALKENYL OLEFINIC ALCOHOL ESTERS WITH CROTONALDEHYDE

Pliny O. Tawney, Passaic, N. J., assignor to United States Rubber Company, New York, N. Y., a corporation of New Jersey No Drawing. Application December 30, 1948, Serial No. 68,389

7 Claims. (Cl. 260—73)

The invention relates to a new class of soluble, unsaturated interpolymers prepared by copolymerization of mixtures of a 2-alkenyl ester containing at least one additional olefinic linkage, and a 3-hydrocarbon-2-alkenal, with or without the inclusion of a third, copolymerizable monoolefinic compound, which interpolymers can be converted to an insoluble and substantially infusible state by further polymerization or copolymerization.

Polymers and copolymers of 2-alkenyl esters containing additional olefinic linkages, e. g., allyl acrylate, allyloxyethyl acrylate, diallyl fumarate, diallyloxyethyl fumarate, diallyl oxalate, etc., are of considerable industrial interest, particularly in the field of coating compositions where their good color retention, solvent resistance and heat stability are especially attractive. However, the widespread use of these polymers and copolymers has been severely limited by the difficulty in obtaining them in an initially soluble, fusible form, which after application, e. g., coating or molding, can be cured to a solvent- and heat-resistant state. In the preparation of such resins, the reaction mixture gels before more than a minor proportion of the monomeric materials present has been converted to the polymeric form and the resulting intractable mixture of insoluble gel, low molecular weight polymers and unreacted monomers is of little or no commercial utility. By halting the polymerization before gelation occurs, a small amount of soluble, unsaturated polymer can be obtained in some cases, although it must be subjected to extensive purification to remove the unreacted starting materials and the latter, for economic reasons, must be recovered, purified and recycled for use in subsequent polymerizations. Nor have the prior art attempts to increase the economic feasibility of this process met with any significant degree of success, since the increased amount of ungelled polymers obtained by carrying out the reaction in the presence of large amounts of catalyst, inhibitors, diluents and/or at high temperatures, are actually small or insignificant. Moreover, such processes frequently entail additional purification steps in order that the properties of the resulting resin not be impaired by the presence of catalyst fragments, inhibitors, etc.

I have now discovered that the prior art difficulties in preparing soluble polymers and interpolymers of polyolefinic 2-alkenyl esters can be successfully overcome by interpolymerizing such esters with 3-hydrocarbon-2-alkenals whereby the major proportion of the esters can be converted to the soluble polymeric form without danger of premature insolubilization.

My discovery is particularly surprising in view of the prior art disclosure (U. S. 2,332,900) which states that the copolymerization of polyolefinic 2-alkenyl esters, e. g., diallyl fumarate, with acrylaldehydes yields insoluble, cross-linked products.

In contrast, I have found that the presence of as little as 0.2 mole of a 3-hydrocarbon-2-alkenal (per mole of the polyolefinic 2-alkenyl ester) is sufficient to effect a marked increase in the amount of a polyolefinic-2-alkenyl ester convertible to the soluble, polymeric form. Moreover, as the amount of the interpolymerizable 2-alkenal is increased to approximately 1.5–3.0 moles, the major proportion of the polyolefinic 2-alkenyl ester, or mixtures thereof with the third, copolymerizable monoolefinic compound, is converted to the soluble, convertible form without danger of gelation, and even higher conversions can be effected when the amount of the 2-alkenal is still further increased, e. g., to 5–8 moles.

The 3-hydrocarbon-2-alkenals which are operable in my invention have the type formula RCH=CR'—CHO wherein R is a hydrocarbon radical from the class of alkyl, especially alkyl groups having from 1 to 20 carbon atoms, (e. g., methyl, ethyl, propyl, isopropyl, butyl, isobutyl, amyl, hexyl, heptyl, octyl, isooctyl, nonyl, decyl, undecyl, dodecyl), cycloalkyl (e. g., cyclopentyl, cyclohexyl), aryl (e. g., phenyl, tolyl, xylyl, p-chlorophenyl, naphthyl), and aralkyl (e. g., benzyl, 2-phenylethyl), and R' is a radical selected from the class of hydrogen and one of the substituents from the group defined above for R. Exemplary of such compounds are 2-butenal (crotonaldehyde), 2-methyl-2-butenal (tiglic aldehyde), 2-methyl-2-pentenal, 2-ethyl-2-hexenal, and 3-phenyl-2-propenal (cinnamaldehyde).

Suitable polyolefinic 2-alkenyl esters for use in my invention include the esters of allyl-type alcohols having the type formula R*CH=CR*—CH<sub>2</sub>—OH where one of the R* is hydrogen, while the other is hydrogen, chlorine, methyl, ethyl and phenyl, as well as the allyloxyalkanols of the formula

R*CH=CR*—CH₂—O—CHRφ—CHRφ—OH where R* is as defined above and Rφ is hydrogen or alkyl, especially alkyl groups having from 1 to 20 carbon atoms, e. g., methyl, ethyl, propyl, butyl, amyl, hexyl, heptyl and octyl. Exemplary of such alcohols are allyl, methallyl, ethallyl, chloroallyl, crotyl, cinnamyl, beta-allyloxyethyl, beta-methallyloxyethyl and beta-allyloxypropyl alcohols. Of the allyl-type alcohols and allyloxyalkanols, those in which the terminal substituent, R*, is hydrogen are preferred. The polyolefinic 2-alkenyl esters derived from the allyloxyalkyl-type alcohols are of particular interest to the surface-coating industry since such esters yield "air-drying" type polymers in many cases.

Such olefinic alcohols can be esterified with olefinic monocarboxylic acids and with both nonenic and olefinic polybasic acids to yield polyolefinic esters for use in my invention. Exemplary of the former class are the acrylic acid types of the general formula R*CH=CR*—COOH where R* is as defined above, e. g., acrylic, methacrylic, ethacrylic, chloracrylic, crotonic and cinnamic acids, and the terminal R* is preferably hydrogen. Of the polybasic acids, the olefinic and in particular the alpha-olefinic acids are preferred by reason of the ready interpolymerizability of their alkenyl esters according to my invention as well as because of the high yields of soluble, convertible resins obtained therefrom and the desirable properties of the final cured products, including toughness, adhesion and flexibility. Such acids include fumaric, itaconic, maleic, citraconic, mesaconic and aconitic in the approximate order of their preference based on the above criteria as well as on cost and availability.

The poly-2-alkenyl esters of the non-enic polycarboxylic acids can likewise be employed in my invention. Exemplary of such acids are oxalic, malonic, alpha-methyl-malonic, succinic, glutaric, adipic, pimelic, suberic, azelaic, sebacic, and phthalic acids of which the latter is especially preferred. In general 2-alkenyl esters of the non-enic polycarboxylic acids tend to interpolymerize somewhat less rapidly than the esters of the previously defined classes, and the curing of the resulting resins often requires more stringent conditions. The interpolymerizability of such esters can be improved by inclusion in the initial reaction mixture of a copolymerizable monoolefinic acid or a hydrolyzable derivative thereof, e. g., diethyl fumarate or methyl acrylate.

Another useful class of poly-2-alkenyl esters are those derived from inorganic polybasic acids, e. g., carbonic, and sulfuric, and particularly those derived from the tri- and tetravalent acids including phosphoric, silicic, stannic and titanic acids. The 2-alkenyl esters derived from this latter group yield soluble, convertible interpolymers by my method which are useful as baking enamels and other non-flammable plastic objects capable of withstanding high temperatures. Like the poly-2-alkenyl esters of the nonenic polycarboxylic acids, the poly-2-alkenyl esters of the polybasic inorganic acids often interpolymerize more readily and yield more satisfactory resins when a copolymerizable monoolefinic compound such as a monoolefinic acid or hydrolyzable derivative thereof is likewise employed in the interpolymerization reactant mixture.

A representative list of the polyolefinic esters from the above defined class includes allyl acrylate, allyl methacrylate, beta-allyloxyethyl acrylate, chlorallyl acrylate, allyl chloroacrylate, allyl ethacrylate, methallyl cinnamate, allyl crotonate, crotyl acrylate, diallyl fumarate, dimethallyl fumarate, di-beta-allyloxyethyl fumarate, di-beta-methallyloxyethyl fumarate, diallyl itaconate, di-beta-allyloxyethyl itaconate, dimethyllyl maleate, diallyl citraconate, dimethallyl citraconate, triallyl aconitate, diallyl oxalate, diallyl succinate, dichloroallyl adipate, dicrotyl succinate, dimethyllyl adipate, di-beta-allyloxyethyl adipate, diallyl phthalate, dimethallyl phthalate, dichloroallyl phthalate, di - beta - allyloxyethyl phthalate, diallyl carbonate, diallyl sulfate, triallyl phosphate, trimethallyl phosphate, tri-beta-allyloxyethyl phosphate, tetrallyl silicate, tetramethallyl stannate and tetrallyl titanate.

As previously mentioned, a wide variety of other monoolefinic compounds may be present in the reaction mixture as a third copolymerizable component, together with the polyolefinic 2-alkenyl ester and the 3-hydrocarbon-2-alkenal. A particularly suitable class of such third components are those of the type formula RR'C=R''R''' wherein R is hydrogen, fluorine or methyl; R' is hydrogen, fluorine, carboxyl or a group hydrolyzable to carboxyl including carboalkoxy (e. g., carbomethoxy, carboethoxy and carbohexoxy), carboaryloxy (e. g., carbophenoxy and carbotolyloxy), carbaralkoxy (e. g., carbobenzyloxy), carbamyl, N-alkylcarbamyl (e. g., N-methylcarbamyl), N-arylcarbamyl (e. g., N-phenylcarbamyl), and carbonitrilo; R'' may be hydrogen, lower alkyl (e. g., methyl and ethyl), chlorine, fluorine, carboxyl and derivatives hydrolyzable to carboxyl as defined above; R''' may be hydrogen, methyl, chlorine, fluorine, aryl (e. g., phenyl, p-chlorophenyl, p-methoxyphenyl, tolyl, xylyl and naphthyl), carboxyl and groups hydrolyzable to carboxyl, alkoxy (e. g., methoxy, ethoxy, propoxy, isopropoxy, butoxy, amyloxy, hexoxy, heptoxy, octoxy, nonoxy, decoxy), cycloalkoxy (e. g., cyclopentoxy, cyclohexoxy), aryloxy (e. g., phenoxy, tolyloxy, naphthoxy, p-chlorophenoxy, p-methoxyphenoxy), aralkoxy (e. g., benzyloxy), acyloxy where the acyl group is devoid of olefinic and acetylenic unsaturation (e. g., acetoxy, propionoxy, butyroxy, benzoyloxy), acyl as previously defined (e. g., acetyl, propionyl, isobutyryl, benzoyl); and R''' may additionally be carboxylmethyl or a derivative hydrolyzable thereto as defined above, when R'' is carboxyl or a derivative hydrolyzable thereto, and R''' may together with R' comprise a carbanhydro group,

—CO—O—CO— carbimido group, —CO—NR+—CO, where R+ is hydrogen, alkyl (e. g., methyl ethyl, propyl, isopropyl, butyl, isobutyl, amyl, hexyl, heptyl, octyl, nonyl, decyl), cycloalkyl (e. g., cyclopentyl, cyclohexyl), aryl (e. g., phenyl, tolyl, xylyl, xenyl, naphthyl) or aralkyl (e. g., benzyl, beta-phenylethyl).

Of the proposed third copolymerizable monoolefinic components, the following classes are especially preferred:

Class A

CH₂=CR''R''' where R'' is hydrogen or methyl; and R''' is chlorine, fluorine, acyloxy, aryl, alkoxy, aryloxy, aralkoxy, carbalkoxy, carbonitrilo, carbamyl or acyl.

Class B

where R'' and R''' are identical substituents from the class of methyl, chlorine, fluorine, carbalkoxy and carbonitrilo.

Class C

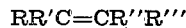

where R and R'' are hydrogen or methyl and R' and R''' are carbalkoxy or carbonitrilo.

Exemplary of the above compounds are isobutylene, styrene, p-chlorostyrene, vinyl chloride, vinylidene chloride, vinyl acetate, vinyl butyrate, methyl vinyl ketone, n-butyl acrylate, tolyl acrylate, benzyl acrylate, methyl acrylate, methyl methacrylate, beta-chloroethyl acrylate, ethyl alpha-chloroacrylate, acrylamide, N-methylacrylamide, acrylonitrile, methacrylonitrile, fumaronitrile, diethyl fumarate, dibutyl maleate, dimethyl mesaconate, dimethyl citraconate, dihexyl itaconate, maleimide, N-butylmaleimide, n-butyl vinyl ether, hexyl vinyl ether, phenyl vinyl ether, and benzyl vinyl ether.

By the appropriate choice of the third, copolymerizable monoolefinic compound, numerous variations in the properties of the resulting soluble, unsaturated interpolymers can be attained. Thus, the interpolymerization of a polyolefinic-2-alkenyl ester and a 3-hydrocarbon-2-alkenal with isobutylene or styrene yields resins of improved compatibility with cheap hydrocarbon solvents, an important factor in the formulation of commercial surface coatings. Copolymerization with a halogenated monoolefinic compound such as vinyl chloride, vinylidene chloride or a dichlorostyrene as the third component, yields polymeric materials of increased flame-resistance and often of greater hardness. Harder products can also be obtained by copolymerization with olefinic acid nitriles, amides and imides, e. g., acrylic nitrile and methacrylamide as the third component. On the other hand, softer and more flexible products can usually be obtained by the copolymerization with, as the third component, one of the olefinic acid esters of nonenic monohydric alcohols including the acrylates, methacrylates, maleates, fumarates, itaconates, mesaconates and aconitates, particularly such esters derived from alcohols containing a chain of two or more carbon atoms, e. g., ethanol, n-butanol, 2-ethyl-1-hexanol, and 1-octanol.

In the practice of my invention, the polyolefinic 2-alkenyl ester is heated, e. g., at 25–120° C. with from 0.2 to 10, preferably 1.5 to 8, molar equivalents of a 3-hydrocarbon-2-alkenal of the defined class and with from 0.0 to 8.0, preferably 0.0 to 5.0, molar equivalents of the copolymerizable monoolefinic compound, RR'C=CR''R''', as defined above. The reaction times will vary somewhat depending upon the interpolymerization reactants employed as well as the proportion thereof, but times in the range of 0.5 to 150 hours are usually sufficient. The reaction time is most preferably such that the formation of soluble interpolymer reaches a maximum as is indicated by attainment of the point of incipient gelation or failure of the reaction mixture to increase in viscosity upon further heating thereof. My interpolymerization reactions are promoted by the presence of free radicals, including those obtained by the thermal decompositions of peroxides, e. g., organic peroxides such as acetyl peroxide, benzoyl peroxide and tertiary-butyl hydroperoxide. Such promoters are generally employed in amounts of from 0.1 to 20.0%, usually from 0.1 to 5.0%, by weight of the reactant mixture, and may be added either at the beginning or incrementally throughout the reaction. The latter method is often preferable where reaction times exceed 24 hours duration.

The course of the reaction can be followed by measuring the increasing viscosity of the reaction mixture and the product can be isolated therefrom by precipitation through addition of a non-solvent, e. g., n-hexane or diethyl ether, or by removal of any unreacted starting materials by preferential extraction or distillation. Although it is unnecessary for most commercial applications, my interpolymers can be further purified, as for analytical purposes, by solution in a minimum volume of solvent and reprecipitation by dilution with an excess of n-hexane or diethyl ether.

My new interpolymers can be employed in the solid form as thermosetting molding powders for the preparation of various objects including rods, blocks and sheets. However, since my interpolymers in many cases can be readily cured in the presence of air or oxygen, they are particularly well adapted to the preparation of surface coatings and for such purposes, they may be employed in the presence of diluents and indeed the crude interpolymerization reaction mixtures themselves can be used for such processes by dilution with a high-boiling solvent, e. g., xylene, and subsequent removal of any of the unreacted 2-alkenal by distillation or other means.

Alternatively my interpolymers can be dissolved in liquid, copolymerizable ethylenic compounds, e. g., phenyl acrylate, allyl methacrylate, diethyl fumarate and vinyl benzoate, to yield solutions which are capable of being totally polymerized and leaving no solvent to be evaporated. Such solutions are particularly useful in applications where evaporation of a solvent constitutes a technical or health hazard. They are likewise useful as fluid molding compositions capable of being cured with a minimum of shrinkage.

Application of heat, e. g., temperatures such as 60–200° C., to compositions containing my interpolymers particularly in the presence of catalysts, induces polymerization whereby the products are converted to an insoluble and essentially infusible state. Suitable inert addends including dyes, pigments, fillers and plasticizers can be incorporated with my interpolymers, preferably at the soluble, fusible stage prior to final cure.

The following examples disclose my invention in more detail. All parts are by weight.

EXAMPLE 1

To illustrate my discovery of the effect of interpolymerizable 3-hydrocarbon-2-alkenals upon the polymerizations and copolymerizations of polyolefinic 2-alkenyl esters, various mixtures thereof are heated at 60° C. in the presence of benzoyl peroxide as a promoter until in each case the point of incipient gelation is attained or until no further increase in the viscosity of the reaction mixture is detectable. The reaction mixture is then diluted with an excess of n-hexane or diethyl ether and the precipitated polymer is further purified by repeated solution in a minimum volume of acetone and precipitation by the addition of one of the above non-solvents. The polymers are finally dried in vacuo to constant weight.

In Table I are summarized the weights of the monomeric starting materials, the peroxide catalyst and the polymeric products, as well as the reaction times. To emphasize the advantages of my invention over the prior art, the copolymerizations of the polyolefinic 2-alkenyl esters in the absence of the 2-alkenals of my invention are also inclined (I–1, 4, 6, 8, 10, 12, 14, 16, 18, 20, 26, 27, 30, 32).

*Analysis.*—Found: Iodine (Wijs) number 116.5.

The iodine number indicates the large amount of residual unsaturation in the copolymer which is available for further polymerization. The iodine number also confirms the presence of co-

Table I

| | Poly Olefinic Ester | | Copol. Monomer | | Croton-aldehyde | Perox. | Reaction Time, Hrs. | Product |
|---|---|---|---|---|---|---|---|---|
| 1 | Allyl Acrylate | 100 | Styrene | 50 | | 0.02 | 2.33 | 3.14 |
| 2 | do | 100 | do | 50 | 10.0 | 0.8 | 2.25 | 20.0 |
| 3 | do | 100 | do | 50 | 100 | 0.4 | 10.0 | 39.5 |
| 4 | do | 100 | Methyl Acrylate | 50 | | 0.02 | | 3.5 |
| 5 | do | 100 | do | 50 | 100 | 0.4 | 1.0 | 107.0 |
| 6 | do | 100 | Diethyl Fumarate | 50 | | 0.15 | 20.6 | 19.9 |
| 7 | do | 100 | do | 50 | 200 | 2.0 | 33.5 | 68.0 |
| 8 | Allyl Methacrylate | 100 | | | | 0.02 | 2.0 | 7.83 |
| 9 | do | 100 | | | 100 | 1.8 | 0.5 | 25.4 |
| 10 | Diallyl Adipate | 100 | Diethyl Fumarate | 50 | | 5.0 | 18.0 | 18.5 |
| 11 | do | 100 | do | 50 | 100 | 8.0 | ¹ 123.0 | 62.5 |
| 12 | Diallyl Phthalate | 100 | do | 50 | | 8.0 | 25.5 | 14.5 |
| 13 | do | 100 | do | 50 | 100 | 8.0 | ¹ 123.0 | 84.5 |
| 14 | Diallyl Maleate | 100 | | | | 1.23 | 7.0 | 18.4 |
| 15 | do | 100 | | | 143.0 | 8.0 | ¹ 125 | 48.9 |
| 16 | Diallyl Itaconate | 100 | | | | 1.14 | 1.2 | 9.7 |
| 17 | do | 100 | | | 143.0 | 8.0 | ¹ 120.0 | 85.5 |
| 18 | do | 100 | Styrene | 50 | | 2.3 | 2.1 | 38.5 |
| 19 | do | 100 | do | 50 | 100 | 8.0 | 23.9 | 107.0 |
| 20 | Diallyl Fumarate | 100 | | | | 1.0 | 4.25 | 9.0 |
| 21 | do | 100 | | | | 9.0 | 1.54 | 4.00 | 16.6 |
| 22 | do | 100 | | | | 23.8 | 2.08 | 11.2 | 25.1 |
| 23 | do | 100 | | | | 53.5 | 3.08 | 24.0 | 38.7 |
| 24 | do | 100 | | | | 143.0 | 6.16 | 74.0 | 74.5 |
| 25 | Dimethallyl Fumarate | 100 | | | | 46.8 | 2.70 | 38.5 | 46.5 |
| 26 | Diallyl Fumarate | 100 | | | | (²) | 2.47 | 2.5 | 17.4 |
| 27 | do | 100 | Styrene | 53 | | 1.53 | 2.3 | 18.4 |
| 28 | do | 100 | do | 53 | 10 | 2.0 | 3.1 | 17.8 |
| 29 | do | 100 | do | 53 | 100 | 4.0 | 10.9 | 80.0 |
| 30 | do | 100 | Methyl Acrylate | 44.0 | | 0.5 | 1.5 | 6.6 |
| 31 | do | 100 | do | 44.0 | 100 | 4.0 | 4.9 | 154.0 |
| 32 | do | 100 | Vinyl Acetate | 43.8 | | 0.5 | 3.0 | 7.4 |
| 33 | do | 100 | do | 42.8 | 100 | 5.6 | 103.5 | 72.0 |

¹ No evidence of incipient gelation.
² Crotonaldehyde replaced by 44 parts of benzene.

EXAMPLE 2

In the manner of Example 1 above, various allyloxyethyl esters are interpolymerized with crotonaldehyde in the presence and absence of third copolymerizable monoolefinic compounds. These reactions are summarized below in Table II.

polymerized diallyl fumarate in the polymer. The presence of copolymerized crotonaldehyde can be demonstrated by the preparation of the polymeric oxime as follows:

Fifty parts of the crude copolymerization reaction mixture prepared in (a) above are evacu-

Table II

| | Allyloxy-Ethel Ester | | Croton-Aldehyde | Copolymerizable Mono-olefinic Compound | | Benzoyl Peroxide | Reaction Time, Hrs. | Polymeric Product |
|---|---|---|---|---|---|---|---|---|
| 1 | β-Allyloxyethel Acrylate | 100 | | | | ¹ 0.0 | 0.5 | 9.3 |
| 2 | do | 100 | 100 | | | 0.1 | 48.1 | 46.0 |
| 3 | Di-β-Allyloxyethyl Itaconate. | 100 | | | | 2.0 | 2.6 | 22.4 |
| 4 | do | 100 | 100 | | | 0.4 | ¹ 80.0 | 82.2 |
| 5 | do | 100 | | Styrene | 25 | 1.0 | 6.5 | 38.5 |
| 6 | do | 100 | 100 | do | 25 | 0.4 | 30.75 | 70.5 |
| 7 | do | 100 | | Diethyl Fumarate | 25 | 0.00 | 5.33 | 33.8 |
| 8 | do | 100 | 100 | do | 25 | 0.8 | ² 80.0 | 93.5 |

¹ Use of peroxide induces almost instantaneous gelation.
² No evidence of incipient gelation.

EXAMPLE 3

(a) A mixture of 98 parts of diallyl fumarate, 200 parts of crotonaldehyde and 10 parts of a 60% solution of tertiary-butyl hydrogen peroxide (such as that available from Union Bay State Co.) is heated at reflux for 24 hours, after which the copolymerization reaction mixture is cooled to room temperature.

(b) Thirty parts of the crude reaction mixture from (a) is poured into n-hexane and the precipitated copolymer is further purified by solution in chloroform and reprecipitation with n-hexane and after drying to constant weight in vacuo, 10 parts of polymeric solid are obtained which corresponds to a total yield of 98 parts of copolymer from the entire reaction mixture.

ated at 35° C. and 20 mm. pressure to remove any unreacted crotonaldehyde. The syrup-like residue is then diluted with 33 parts of xylene and evacuation resumed at 35° C. and 10 mm. pressure until 27.5 parts of a solution of the copolymer in xylene are finally obtained. Eleven parts of this solution are diluted with 85 parts of benzene and the resulting solution is admixed with 50 parts of 90% aqueous ethanol containing 3.5 parts of hydroxylamine hydrochloride neutralized with an excess of sodium carbonate. Upon refluxing the mixture, a brilliant green color develops which gradually fades to a dark brown tint. After refluxing for 6 hours, the mixture is evaporated on a steam bath to a volume of approximately 65 mls. The concentrated reaction mixture is then poured into 800 parts of water previously acidified with a few drops of concentrated hydrochloric acid. The precipitate thus obtained is redissolved in a minimum amount of chloroform and precipitated by the addition of absolute ethanol. The precipitated polymer is washed with ethanol and dried in vacuo.

*Analysis.*—Found: N 1.20%.

The nitrogen content of the product arises from the presence of oxime groups which are formed by the reaction of hydroxylamine with the carbonyl groups in the original copolymer.

(c) Seventy-five parts of the crude copolymerization reaction mixture from (a) above are evacuated at 35° C. and 2 mm. pressure to a thick syrup. Fifty parts of xylene are then added and evacuation continued until the residual solution is free from any unreacted crotonaldehyde. A mixture of 42.3 parts of xylene and 3 parts of n-butanol are added and evacuation continued until 75 parts of resin solution are obtained. Ten parts of this solution are admixed with 0.004 part of cobalt, as cobalt naphthenate, and a sample is flowed onto a glass panel. After baking for 10 minutes at 100° C., a hard, clear, colorless film is obtained which is not attacked by acetone. Another sample of the coating solution is flowed onto a walnut veneer panel and after standing for 15 hours at room temperature (25° C.) the resulting film is clear, mar-resistant and insoluble in acetone. Another walnut panel is coated with the above solution and heated at 50° C. After 2.5 hours the film is completely cured to a solvent and mar-resistant finish.

EXAMPLE 4

(a) Forty-nine parts of diallyl fumarate are mixed with 100 parts of crotonaldehyde and 2.50 parts of a 60% solution of tertiary-butyl hydrogen peroxide, and heated at reflux for 24 hours. The reaction mixture is then cooled to room temperature and evacuated at 2 mm. pressure to a thick syrup. The syrup is poured into n-hexane and the precipitated copolymer is further purified by repeated solution in acetone and precipitation with hexane. After drying in vacuo to constant weight, 47 parts of polymeric solid are obtained which is soluble in acetone, chloroform, benzene, ethyl acetate and an 80:20 mixture of xylene and butanol.

(b) Eight parts of the copolymer are dissolved in a mixture of 7.2 parts of xylene, 1.8 parts of n-butanol and 0.3 part of carbitol acetate. A sample of the solution is flowed onto a glass panel and baked for 10 minutes at 200° C. to yield a tough, mar-resistant film which is clear, colorless and completely resistant to attack by acetone.

(c) To 11.8 parts of the solution prepared in (b) above is added 0.9 ml. of xylene containing 0.0051 part of cobalt as cobalt naphthenate. A sample of the solution is flowed onto a glass panel and baked at 100° C. for 30 minutes to give a solvent-resistant coating similar to that prepared in (b) above. Another sample of the solution is baked on glass for 2.5 hours at 50° C. to give an acetone-insoluble film.

EXAMPLE 5

(a) A mixture of 294 parts of diallyl fumarate, 595 parts of crotonaldehyde and 30 parts of a 60% solution of tertiary-butyl hydrogen peroxide is heated at reflux for 24 hours, after which the reaction mixture is cooled to room temperature.

(b) Seven hundred and two parts of the crude copolymerization reaction mixture from (a) above are evacuated at 45° C. and 20 mm. pressure until 375 parts of distillate are removed. Five hundred parts of xylene are then added and evacuation continued until an additional 350 parts of distillate are removed. To the residual syrup is added sufficient xylene to attain a total weight of 525 parts of resin solution.

(1) Twenty parts of the resin solution are admixed with 0.0160 part of cobalt as cobalt naphthenate and the resulting solution is flowed onto a glass panel. After baking for 10 minutes at 100° C. a clear, colorless, mar-resistant film is obtained which is completely resistant to attack by common organic solvents.

(2) A ten-part aliquot of the resin solution is admixed with 0.00458 part of cobalt, as cobalt naphthenate, and divided into two portions. One portion is cured to a solvent-resistant film by baking on glass for 4 hours at 50° C., while the other portion is applied to a walnut veneer panel and cured at 25° C. for 15 hours at a relative humidity in excess of 50% to yield a hard, clear and colorless film of good solvent resistance.

(c) Seventy-two parts of the crude copolymerization reaction mixture from (a) above are evacuated at 35° C. and 2 mm. to a thick syrup. Twenty parts of styrene are then added and evacuation is resumed until 32 parts of residual solution are obtained. To this are added 8 parts of styrene and 0.8 part of benzoyl peroxide and the solution is cured in a plate mold by heating at 60° C. for 15 hours and then at 120° C. for an additional hour. The resulting clear sheet has a Rockwell hardness of M84. It is exceptionally mar-resistant and is not attacked by organic solvents.

(d) Seventy parts of the crude copolymerization reaction mixture from (a) above are admixed with 12 parts of diethyl fumarate and evacuated at 35° C. and 2 mm. pressure to 40 parts of resin solution. A solution of 0.8 part of benzoyl peroxide in 8.5 parts of benzene is added and evacuation continued until the benzene is removed. The resulting syrup is cured in a plate mold by heating at 60° C. for 15 hours and then for 2 additional hours at 120° C. The molded sheet is clear and solvent-resistant and possesses good mar-resistance.

This application is a continuation-in-part of my prior and copending application, Serial No. 646,218, filed February 17, 1946, now abandoned.

Having thus described my invention, what I claim and desire to protect by Letters Patent is:

1. An acetone-soluble, heat-convertible, unsaturated mass interpolymer of monomers consisting of (A) a polyolefinic ester of an olefinic alcohol selected from the group consisting of allyl, methallyl and beta-allyloxyethyl alcohols with an acid selected from the group consisting of acrylic, methacrylic, adipic, phthalic, maleic, fumaric and itaconic acids, said acid being fully esterified with said alcohol, (B) from 0.2 to 10 moles of crotonaldehyde per mole of (A), and (C) up to 8.0 moles of a copolymerizable monoolefinic compound selected from the group consisting of styrene, methyl acrylate, diethyl fumarate and vinyl acetate per mole of (A).

2. An acetone-soluble, heat-convertible, unsaturated mass interpolymer of monomers consisting of (A) a polyolefinic ester of an olefinic alcohol selected from the group consisting of allyl, methallyl and beta-allyloxyethyl alcohols with an acid selected from the group consisting of acrylic, methacrylic, adipic, phthalic, maleic, fumaric and itaconic acids, said acid being fully esterified with said alcohol, (B) from 1.5 to 8 moles of crotonaldehyde per mole of (A), and (C) up to 5.0 moles of a copolymerizable mono-olefinic compound selected from the group consisting of styrene, methyl acrylate, diethyl fumarate and vinyl acetate per mole of (A).

3. An acetone-soluble, heat-convertible, unsaturated mass interpolymer of monomers consisting of (A) diallyl fumarate and (B) from 1.5 to 8 moles of crotonaldehyde per mole of (A).

4. An acetone-soluble, heat-convertible, unsaturated mass interpolymer of monomers consisting of (A) diallyl fumarate, (B) from 1.5 to 8 moles of crotonaldehyde per mole of (A), and (C) styrene in amount up to 5.0 moles per mole of (A).

5. An acetone-soluble, heat-convertible, unsaturated mass interpolymer of monomers consisting of (A) diallyl fumarate, (B) from 1.5 to 8 moles of crotonaldehyde per mole of (A), and (C) methyl acrylate in amount up to 5.0 moles per mole of (A).

6. An acetone-soluble, heat-convertible, unsaturated mass interpolymer of monomers consisting of (A) allyl acrylate, (B) from 1.5 to 8 moles of crotonaldehyde per mole of (A), and (C) styrene in amount up to 5.0 moles per mole of (A).

7. An acetone-soluble, heat-convertible, unsaturated mass interpolymer of monomers consisting of (A) diallyl phthalate, (B) from 1.5 to 8 moles of crotonaldehyde per mole of (A), and (C) diethyl fumarate in amount up to 5.0 moles per mole of (A).

PLINY O. TAWNEY.

REFERENCES CITED

The following references are of record in the file of this patent:

UNITED STATES PATENTS

| Number | Name | Date |
| --- | --- | --- |
| 2,260,005 | D'Alelio | Oct. 21, 1941 |
| 2,375,256 | Soday | May 8, 1945 |
| 2,378,195 | D'Alelio | June 12, 1945 |
| 2,378,197 | D'Alelio | June 12, 1945 |
| 2,388,167 | Marple | Oct. 30, 1945 |
| 2,431,374 | D'Alelio | Nov. 24, 1947 |

FOREIGN PATENTS

| Number | Country | Date |
| --- | --- | --- |
| 517,684 | Great Britain | Feb. 6, 1940 |